US010149100B2

(12) United States Patent
Zhang

(10) Patent No.: US 10,149,100 B2
(45) Date of Patent: Dec. 4, 2018

(54) METHOD AND APPARATUS FOR PROVIDING LOCATION INFORMATION OF MOBILE TERMINAL

(71) Applicants: BEIJING JINGDONG SHANGKE INFORMATION TECHNOLOGY CO, LTD., Haidian District, Beijing (CN); BEIJING JINGDONG CENTURY TRADING CO., LTD., Beijing (CN)

(72) Inventor: Yuhan Zhang, Beijing (CN)

(73) Assignees: BEIJING JINGDONG SHANGKE INFORMATION TECHNOLOGY CO, LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 67 days.

(21) Appl. No.: 15/124,855

(22) PCT Filed: Feb. 17, 2015

(86) PCT No.: PCT/CN2015/073231
§ 371 (c)(1),
(2) Date: Sep. 9, 2016

(87) PCT Pub. No.: WO2015/135418
PCT Pub. Date: Sep. 17, 2015

(65) Prior Publication Data
US 2017/0026793 A1 Jan. 26, 2017

(30) Foreign Application Priority Data
Mar. 12, 2014 (CN) .......................... 2014 1 0088848

(51) Int. Cl.
H04W 24/00 (2009.01)
H04W 4/02 (2018.01)
H04W 12/02 (2009.01)

(52) U.S. Cl.
CPC ............. *H04W 4/023* (2013.01); *H04W 4/02* (2013.01); *H04W 12/02* (2013.01)

(58) Field of Classification Search
CPC . H04W 4/028; H04W 36/0083; H04W 16/08; H04W 16/32; H04W 4/08; H04W 24/08
See application file for complete search history.

(56) References Cited

U.S. PATENT DOCUMENTS 8,010,117 B1 * 8/2011 Sigg ...................... H04W 16/06
370/331
8,560,608 B2 * 10/2013 Petersen ........... G06F 17/30867
455/435.1

(Continued)

FOREIGN PATENT DOCUMENTS

CN 102196032 A 9/2011
CN 103826204 A 5/2014
WO 2013178284 A1 12/2013

OTHER PUBLICATIONS

International Search Report for Application No. PCT/CN2015/073231 dated May 20, 2015 (2 pages).

Primary Examiner — Khalid Shaheed
(74) Attorney, Agent, or Firm — Michael Best & Friedrich LLP

(57) ABSTRACT

The present invention provides a method and apparatus for providing location information of a mobile terminal, which help to shorten the time for determining an anonymous area of a user. The present invention also aims at reducing the size of the anonymous space area as much as possible so as to ensure the quality of a location-based service. The method for providing location information of a mobile terminal in the present invention comprises: acquiring information (Continued)

about space division from a server, the space division meaning that a specified space is divided into grids with preset side lengths, and acquiring the numbers of mobile terminals in the grids from the server; determining a grid where a mobile terminal is currently located according to the information about the space division; for the grid where the mobile terminal is currently located, determining whether the area of the grid and/or the number of mobile terminals in the grid reaches a preset value, and if yes, providing an identifier of the grid to the server; otherwise, merging the grid with grids near the grid until the area of the multiple merged grids and/or the number of mobile terminals in the grids reaches the preset value, and providing identifiers of the multiple grids to the server.

10 Claims, 2 Drawing Sheets

(56) References Cited

U.S. PATENT DOCUMENTS

| | | |
|---|---|---|
| 2002/0077127 A1 | 6/2002 | Heckard et al. |
| 2009/0323549 A1* | 12/2009 | Jerbi .................... G08G 1/0104 370/252 |
| 2011/0230203 A1* | 9/2011 | Ihara ................... G06F 21/6245 455/456.1 |
| 2013/0081137 A1* | 3/2013 | Geigel ................ G06F 11/3006 726/23 |
| 2013/0223627 A1* | 8/2013 | Noda ...................... H04L 9/083 380/270 |
| 2014/0066018 A1 | 3/2014 | Zhu |

* cited by examiner

METHOD AND APPARATUS FOR PROVIDING LOCATION INFORMATION OF MOBILE TERMINAL

TECHNICAL FIELD

The invention relates to a method and apparatus for providing location information of a mobile terminal.

BACKGROUND ART

In recent years, Location-based Service (LBS), e.g., a location-based emergency service, a location-based entertainment advertising service, etc., has been applied more and more widely. A user must provide accurate location information thereof to a service provider when utilizing these LBSs, while an attacker can access raw location data of the user by the way of a positioned location information transmission setting, an intercepted location information transmission channel and the like, and can also calculate and conclude personal privacy information associated with the location information, so that privacy safety of the user is very seriously threatened.

Currently, a study on an anonymous processing of a user location has achieved certain results in the technical field of LBS. In a Bottom-up anonymous algorithm proposed by Mohamed F. Mokbel, Chi-Yin Chow, et al., the k-anonymity and a minimum space $A_{min}$ are defined by user selves. The algorithm adopts an incomplete pyramid data structure, and decomposes a whole location space into H layers, so the layer with a height of h has $4^h$ grid units. A root of a pyramid with a height of 0 has only one grid unit, and contains the whole location space. The so-called incomplete pyramid data structure refers to that only those grid units which would be possibly used are maintained. For example, if all mobile users have strict privacy requirements, the lowest layer of the pyramid cannot satisfy a privacy protocol of any user, so a server will no longer maintain this layer. If the grid unit where the user is currently located satisfies the privacy requirements of the user, the current grid is returned as an anonymous area of the user, and if it does not satisfy the privacy requirements of the user, a parent grid of the grid is returned, and the algorithm is performed recursively until an anonymous space area satisfying the privacy requirements of the user is generated. Then the anonymous area is sent to the service provider for space querying.

Since a mobile terminal location is changed along with the user at any time, and will possibly change its privacy requirements at any time, the height of the whole pyramid will change frequently along with the change of the user location and the change of the privacy requirements, which results in frequent division and mergence of the grids, and introduces a comparatively large amount of calculation, thereby resulting in that a time for determining the anonymous area of the user is lengthened, and a calculation amount of a terminal device is aggravated.

SUMMARY

In view of this, the present invention provides a method and apparatus for providing location information of a mobile terminal, which help to shorten the time for determining an anonymous area of a user. Another object of the invention is to reduce a size of an anonymous space area as much as possible so as to ensure the quality of a location-based service.

In order to achieve the above object, a method for providing location information of a mobile terminal is provided according to one aspect of the present invention.

The method for providing location information of a mobile terminal in the present invention comprises: acquiring information of space division from a server, the space division referring that a specified space is divided into grids with a preset length of sides, and acquiring a number of mobile terminals in each of the grids from the server; determining the grid where the mobile terminal is currently located in accordance with the information of the space division; deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, and then providing identifiers of the multiple grids to the server.

Optionally, the grid is merged with a grid holding a maximum number of the mobile terminals near the grid in a case that it is decided and confirmed that the number of the mobile terminals in the grid where the mobile terminal is currently located has not reached the preset value.

According to another aspect of the present invention, an apparatus for providing location information of a mobile terminal is provided.

The apparatus for providing location information of a mobile terminal in the present invention comprises: an acquiring module for acquiring information of space division from a server, the space division referring that a specified space is divided into grids with a preset length of sides, and acquiring a number of mobile terminals in each of the grids from the server; a determining module for determining the grid where the mobile terminal is currently located in accordance with the information of the space division; a providing module for deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, and then providing identifiers of the multiple grids to the server.

Optionally, the providing module is further used for merging the grid with a grid holding a maximum number of the mobile terminals near the grid in a case that it is decided and confirmed that the number of the mobile terminals in the grid where the mobile terminal is currently located has not reached the preset value.

According to a further aspect of the invention, another method for providing location information of a mobile terminal is provided.

The method for providing location information of a mobile terminal in the present invention comprises: acquiring information of space division from a server, the space division referring that a specified space is divided into grids with a preset length of sides, and acquiring a number of mobile terminals in each of the grids from the server; determining the grid where the mobile terminal is currently located in accordance with the information of the space division; deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, then deciding whether a sum of the areas of the multiple grids does not exceed the preset value, and if not, providing identifiers of the multiple grids to the server.

Optionally, the grid is merged with a grid holding a maximum number of the mobile terminals near the grid in a case that it is decided and confirmed that the number of the mobile terminals in the grid where the mobile terminal is currently located has not reached the preset value.

According to a further aspect of the invention, another apparatus for providing location information of a mobile terminal is provided.

The apparatus for providing location information of a mobile terminal in the present invention comprises: an acquiring module for acquiring information of space division from a server, the space division referring that a specified space is divided into grids with a preset length of sides, and acquiring a number of mobile terminals in each of the grids from the server; a determining module for determining the grid where the mobile terminal is currently located in accordance with the information of the space division; a providing module for deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, then deciding whether a sum of the areas of the multiple grids does not exceed the preset value, and if not, providing identifiers of the multiple grids to the server.

Optionally, the providing module is further used for merging the grid with a grid holding a maximum number of the mobile terminals near the grid in a case that it is decided and confirmed that the number of the mobile terminals in the grid where the mobile terminal is currently located has not reached the preset value.

According to a further aspect of the invention, a further method for providing location information of a mobile terminal is provided.

The method for providing location information of a mobile terminal in the present invention comprises: a server dividing a specified space into grids with a preset length of sides, counting a number of mobile terminals in each of the grids, and then sending information of space division and the number of the mobile terminals in each of the grids to the mobile terminal; the mobile terminal determining the grid where itself is located in accordance with the information of the space division, deciding whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, and then providing identifiers of the multiple grids to the server.

According to a further aspect of the invention, a further method for providing location information of a mobile terminal is provided.

The method for providing location information of a mobile terminal in the present invention comprises: a server dividing a specified space into grids with a preset length of sides, counting a number of mobile terminals in each of the grids, and then sending information of space division and the number of the mobile terminals in each of the grids to the mobile terminal; the mobile terminal determining the grid where itself is located in accordance with the information of the space division, deciding whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, then deciding whether a sum of the areas of the multiple grids does not exceed the preset value, and if not, providing identifiers of the multiple grids to the server.

According to the technical solution of the invention, the space is divided into multiple rectangular areas, one or more grids are provided as the anonymous area where the user is located in accordance with privacy setting information, and since an area division itself is not changed, and only the number of the grids composing of the anonymous area of the user is changed, an amount of calculation is comparatively small, and the time for determining the anonymous area of the user is shortened. In addition, in the embodiment, the number of the grids in the anonymous area of the user is gradually increased so that the anonymous area of the user is as small as possible, which facilitates the ensuring of the quality of the LBS service.

BRIEF DESCRIPTION OF THE DRAWINGS

Figures are used for better understanding of the invention, and do not make improper limitations of the invention, wherein.

DETAILED DESCRIPTION

Descriptions of exemplary embodiments of the invention, including various details of the embodiments of the invention, are given below by taking figures into consideration to facilitate understanding, and the embodiments should be deemed as only exemplary ones. Thus, those skilled in the art should recognize that various changes and modifications to the embodiments described herein can be made without departing from the scope and spirit of the invention. Similarly, for clarify and simplicity, descriptions of well known functions and structures are omitted in the descriptions below:

In the embodiment of the invention, a server selects, within a range covered by a mobile communication network, an area where it is required to provide an LBS service to carry out the solution of the embodiment. For example, in areas such as a commercial area or a living area of a city, generally speaking, there are a comparatively large number of mobile users needing to use the LBS service. On the contrary, for example, with respect to areas such as a desert and a forest, although they are covered by the mobile communication network, there are a comparatively small number of mobile users, and there are fewer users needing the LBS service. The server divides a selected area (this area is generally identified by latitude and longitude ranges) into a×b grids (where a and b are natural numbers).

With respect to the user located within the grid, a location thereof will be indicated by location(s) of one or more grids, rather than the accurate location of the user, so the accurate location of the user is kept secret to achieve the location anonymity. The area of the grid itself shall not be too small, otherwise considerable accuracy is still maintained when the location of one grid is used to indicate the location of the user, thereby the specific location of the user is revealed, and at this time, it is required to use the locations of multiple grids to indicate the location of the user, which increases an amount of calculation.

In addition, it's preferred for the grid not to be too large, otherwise the location of the user held by the server will be too obscure, which influences the quality of the LBS service. For example, with a rectangle of 300 m×300 m as one grid, when the user therein searches surrounding restaurants, the server provides the restaurants within the rectangle of 300 m×300 m and within a certain range outside an edge thereof, and it is obvious that accuracy is comparatively poor.

If there are multiple users within one grid, when this grid is used as the locations of these users, the locations of these users would become undistinguishable from each other, so the location anonymity is achieved with respect to each of the users therein. Thus, it's preferred that there are as many as users within the area indicating the locations of the users.

Figure 1:
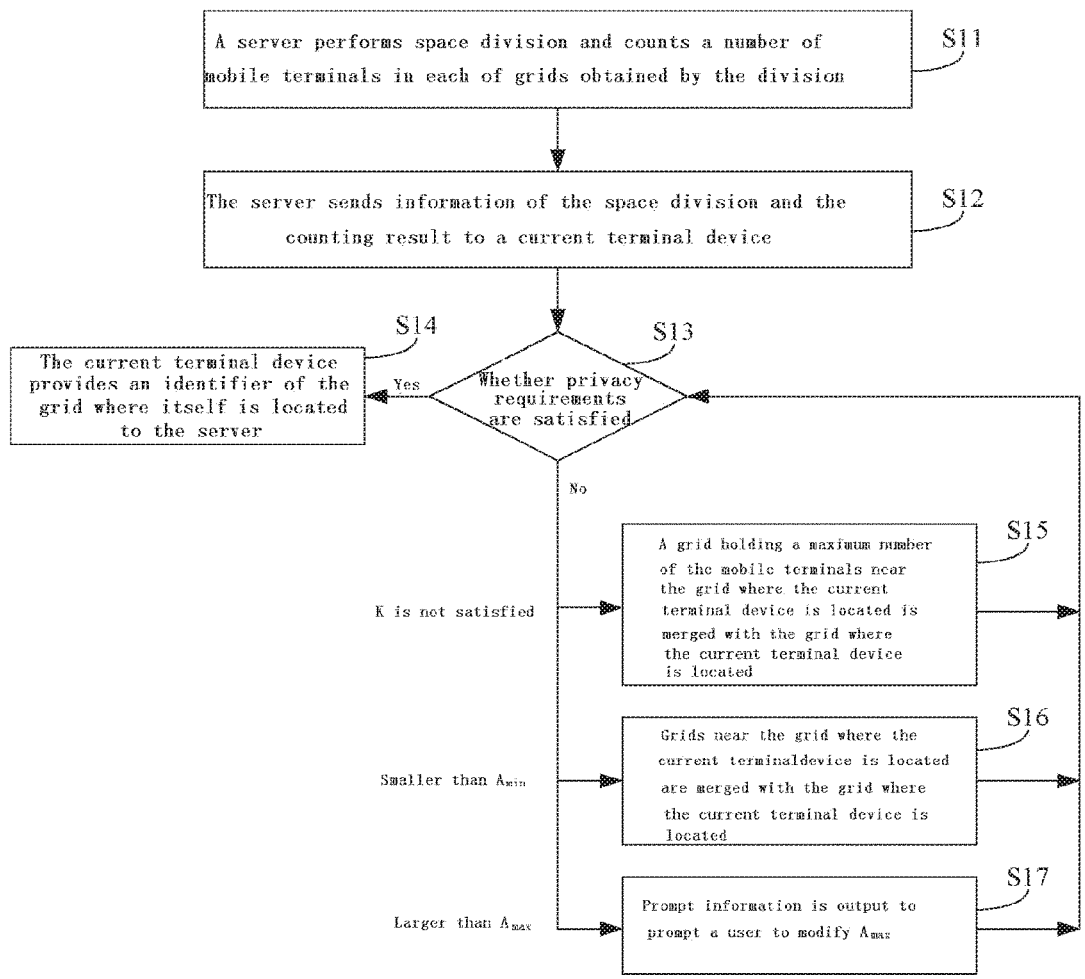
FIG. 1 is a schematic diagram of a preferred flow of a method for providing location information of a mobile terminal according to the embodiment of the invention.

Based on the descriptions above, one preferred mode can be obtained as follows: no less than K users are made to be within the area where the users are located, and this area has a comparatively proper size. In a case that requirements are not too high, it is allowed to only consider the number of the users within the area, or only consider the size of the area. Further descriptions of the preferred mode of a method for providing location information of a mobile terminal according to the embodiment of the invention are given below by taking FIG. 1 into consideration. FIG. 1 is a schematic diagram of a preferred flow of a method for providing location information of a mobile terminal according to the embodiment of the invention, this flow is completed by the server and one mobile terminal device (hereinafter referred to as the "current terminal device"), which are connected via a wireless communication network, i.e., the current terminal device has logged into the server to achieve providing one area containing the current terminal device to the server.

Step S11: A server performs space division and counts a number of mobile terminals in each of grids obtained by the division. In the space division, the selected area is divided into a×b grids, and then counting can be performed. In addition, the server further needs to allocate an identifier to each of the grids after the space division.

Step S12: The server sends information of the space division and the counting result to a current terminal device. The information of the space division mainly includes values of a and b (the unit is, for example, meter), a range of a divided space area (identified by latitude and longitude), and the identifier of each of the grids.

Step S13: The current terminal device decides whether the grid where itself is located satisfies privacy requirements in accordance with privacy setting information. The privacy setting information includes a number K of terminal devices that also log into the server in the grid where the current terminal device is located, and a maximum value $A_{max}$ and a minimum value $A_{min}$ of the area containing the current terminal device provided to the server. In this step, it is to be decided whether the number of the terminal devices that log into the server in the grid where the current terminal device is located reaches K, and it is also to be decided whether the size of the grid where the current terminal device is located is between $A_{min}$ and $A_{max}$. It should be noted that since the area provided to the server should contain at least one grid, the quality of the LBS service has been considered when the server performs the space division, thereby setting the grid to a comparatively small one.

In a case that the privacy requirements are satisfied, a step S14 is proceeded; otherwise, if K is not satisfied, a step S15 is proceeded, if the grid where the current terminal device is located is smaller than $A_{min}$, a step S16 is proceeded, and if the grid where the current terminal device is located is larger than $A_{max}$, a step S17 is proceeded.

Step S14: The current terminal device provides an identifier of the grid where itself is located to the server. After the server receives the identifier, the range of the grid is regarded as the location where the current terminal device is located.

Step S15: A grid holding a maximum number of the mobile terminals near the grid where the current terminal device is located is merged with the grid where the current terminal device is located. A selection can be performed from the adjacent grids of the current terminal. Then the step S13 is returned.

Step S16: Grids near the grid where the current terminal device is located are merged with the grid where the current terminal device is located. The adjacent grids can be merged with the grid where the current terminal device is located, and preferably, the grid holding the maximum number of the mobile terminals near the grid where the current terminal device is located can be merged with the grid where the current terminal device is located. Then the step S13 is returned.

Step S17: Prompt information is output to prompt a user to modify $A_{max}$. In order to obtain a comparatively high quality of the LBS service, $A_{max}$ can be set to a comparatively small value, but it cannot be smaller than the size of one grid. Thus, it's required that the user increases $A_{max}$ in this case. The sizes of the grids are also different when the server divides the space for different areas, so the $A_{max}$ set by the user is possibly changed along with the change of the user location. The step S13 is returned after this step.

After the steps S15, S16 and S17, the step S13 is returned to check again whether the privacy setting is satisfied, if it is not satisfied, it is further required to perform a corresponding adjustment again, and if an area mergence is performed, it is possible that the privacy requirements are satisfied only by merging two or more grids. Along with the change of the user location, the grid where the user is located will change, the size of the grid and the number of the mobile terminals that log into the server in the grid are also changed, and along with a change of a time, the number of the mobile terminals that log into the server in the grid where the user is located is also changed. Thus, it's preferred for the mobile terminal to download new information of the space division and the counting result of the number of the mobile terminals from the server per a certain intervals.

Figure 2:
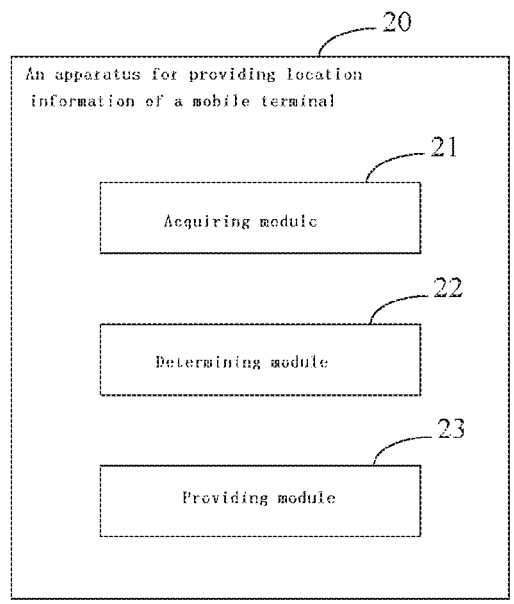
FIG. 2 is a schematic diagram of a basic structure of an apparatus for providing location information of a mobile terminal according to the embodiment of the invention.

Descriptions of an apparatus for providing location information of a mobile terminal according to the embodiment of the invention are given below by taking FIG. 2 and FIG. 3 into consideration. The apparatus can be implemented by software, and is set in a mobile terminal device such as a smart phone. FIG. 2 is a schematic diagram of a basic structure of an apparatus for providing location information of a mobile terminal according to the embodiment of the invention. As shown in FIG. 2, an apparatus 20 for providing location information of a mobile terminal mainly comprises an acquiring module 21, a determining module 22, and a providing module 23.

The acquiring module 21 is used for acquiring information of space division from a server, and acquiring a number of mobile terminals in each of the grids from the server; the determining module 22 is used for determining the grid where the mobile terminal is currently located in accordance with the information of the space division; the providing module 23 is used for deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, and then providing identifiers of the multiple grids to the server. The providing module 23 can be further used for merging the grid with a grid holding a maximum number of the mobile terminals near the grid in a case that it is decided and confirmed that the number of the mobile terminals in the grid where the mobile terminal is currently located has not reached the preset value.

Figure 3:
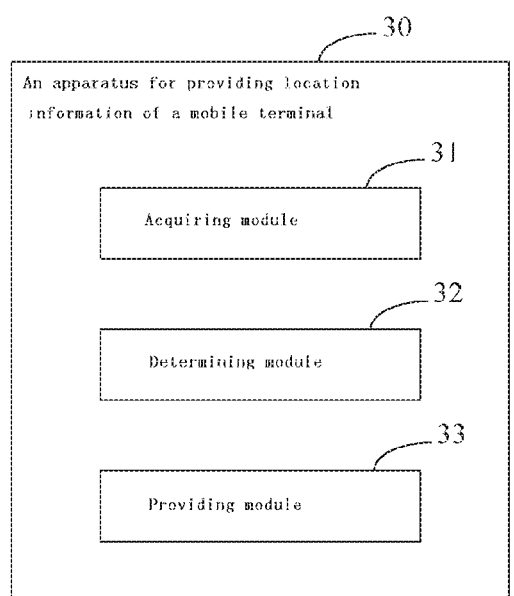
FIG. 3 is a schematic diagram of a basic structure of another apparatus for providing location information of a mobile terminal according to the embodiment of the invention.

FIG. 3 is a schematic diagram of a basic structure of another apparatus for providing location information of a mobile terminal according to the embodiment of the invention. As shown in FIG. 3, an apparatus 30 for providing location information of a mobile terminal mainly comprises an acquiring module 31, a determining module 32, and a providing module 33.

The acquiring module 31 is used for acquiring information of space division from a server, and acquiring a number of mobile terminals in each of the grids from the server; the determining module 32 is used for determining the grid where the mobile terminal is currently located in accordance with the information of the space division; the providing module 33 is used for deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, then deciding whether a sum of the areas of the multiple grids does not exceed the preset value, and if not, providing identifiers of the multiple grids to the server.

The providing module 33 can be further used for merging the grid with a grid holding a maximum number of the mobile terminals near the grid in a case that it is decided and confirmed that the number of the mobile terminals in the grid where the mobile terminal is currently located has not reached the preset value.

According to the technical solution of the embodiment of the invention, the space is divided into multiple rectangular areas, one or more grids are provided as the anonymous area where the user is located in accordance with privacy setting information, and since an area division itself is not changed, and only the number of the grids composing of the anonymous area of the user is changed, an amount of calculation is comparatively small, and the time for determining the anonymous area of the user is shortened. In addition, in the embodiment, the number of the grids in the anonymous area of the user is gradually increased so that the anonymous area of the user is as small as possible, which facilitates the ensuring of the quality of the LBS service.

The basic principles of the invention is described above by taking the specific embodiments into consideration. However, it should be noted that all of or any of steps or components of the method and apparatus of the invention can be understood for those skilled in the art, which can be implemented with hardware, firmware, software or a combination thereof in any computing device (including a processor, a storage medium, etc.) or a network of the computing device. This can be achieved by those skilled in the art by applying their basic programming skills after reading the descriptions of the invention.

Thus, the object of the invention can be also achieved by running a program or a set of programs on any computing device. The computing device can be a general device known. Thus, the object of the invention can be also achieved only by providing a program product including program codes implementing the method or apparatus. That is to say, such program product also constitutes the invention, and a storage medium storing such program product also constitutes the invention. Obviously, the storage medium can be any known storage medium or any storage medium to be developed in the future.

It should be further noted that in the apparatus and method of the invention, the respective components or the respective steps obviously can be decomposed and/or recombined. These decompositions and/or recombinations shall be regarded as equivalent solutions of the invention. And the steps performing the above series of processes can be naturally performed in a timing sequence according to the described sequence, but are not necessarily performed in the timing sequence. Some steps can be performed in parallel or independently from each other.

The above specific embodiments do not constitute a limitation on the scope of protection of the invention. Those skilled in the art shall understand various modifications, combinations, sub-combinations and substitutions can occur depending on design requirements and other factors. Any modifications, equivalent substitutions, improvements, etc. made within the spirit and principle of the invention shall be included in the scope of claims of the invention.

The invention claimed is:

1. A method for providing location information of a mobile terminal, characterized by comprising:
    acquiring information of space division from a server, the space division referring that a specified space is divided into grids with a preset length of sides, and acquiring a number of mobile terminals in each of the grids from the server;
    determining the grid where the mobile terminal is currently located in accordance with the information of the space division;
    deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, and then providing identifiers of the multiple grids to the server.

2. The method according to claim 1, characterized by merging the grid with a grid holding a maximum number of the mobile terminals near the grid in a case that it is decided and confirmed that the number of the mobile terminals in the grid where the mobile terminal is currently located has not reached the preset value.

3. An apparatus for providing location information of a mobile terminal, characterized by comprising:
    an acquiring module for acquiring information of space division from a server, the space division referring that a specified space is divided into grids with a preset length of sides, and acquiring a number of mobile terminals in each of the grids from the server;

a determining module for determining the grid where the mobile terminal is currently located in accordance with the information of the space division;

a providing module for deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, and then providing identifiers of the multiple grids to the server.

4. The apparatus according to claim 3, characterized in that the providing module is further used for merging the grid with a grid holding a maximum number of the mobile terminals near the grid in a case that it is decided and confirmed that the number of the mobile terminals in the grid where the mobile terminal is currently located has not reached the preset value.

5. A method for providing location information of a mobile terminal, characterized by comprising:

acquiring information of space division from a server, the space division referring that a specified space is divided into grids with a preset length of sides, and acquiring a number of mobile terminals in each of the grids from the server;

determining the grid where the mobile terminal is currently located in accordance with the information of the space division;

deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, then deciding whether a sum of the areas of the multiple grids does not exceed the preset value, and if not, providing identifiers of the multiple grids to the server.

6. The method according to claim 5, characterized by merging the grid with a grid holding a maximum number of the mobile terminals near the grid in a case that it is decided and confirmed that the number of the mobile terminals in the grid where the mobile terminal is currently located has not reached the preset value.

7. An apparatus for providing location information of a mobile terminal, characterized by comprising:

an acquiring module for acquiring information of space division from a server, the space division meaning that a specified space is divided into grids with a preset length of sides, and acquiring a number of mobile terminals in each of the grids from the server;

a determining module for determining the grid where the mobile terminal is currently located in accordance with the information of the space division;

a providing module for deciding, for the grid where the mobile terminal is currently located, whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, then deciding whether a sum of the areas of the multiple grids does not exceed the preset value, and if not, providing identifiers of the multiple grids to the server.

8. The apparatus according to claim 7, characterized in that the providing module is further used for merging the grid with a grid possessing a maximum number of the mobile terminals near the grid in a case that it is decided and confirmed that the number of the mobile terminals in the grid where the mobile terminal is currently located has not reached the preset value.

9. A method for providing location information of a mobile terminal, characterized by comprising:

a server dividing a specified space into grids with a preset length of sides, counting a number of mobile terminals in each of the grids, and then sending information of space division and the number of the mobile terminals in each of the grids to the mobile terminal;

the mobile terminal determining the grid where itself is located in accordance with the information of the space division, deciding whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, and then providing identifiers of the multiple grids to the server.

10. A method for providing location information of a mobile terminal, characterized by comprising:

a server dividing a specified space into grids with a preset length of sides, counting a number of mobile terminals in each of the grids, and then sending information of space division and the number of the mobile terminals in each of the grids to the mobile terminal;

the mobile terminal determining the grid where itself is located in accordance with the information of the space division, deciding whether the area of the grid and/or the number of the mobile terminals therein reaches a preset value, and if yes, providing an identifier of the grid to the server; otherwise merging the grid with grids near the grid until the area of the multiple merged grids and/or the number of the mobile terminals therein reaches the preset value, then deciding whether a sum of the areas of the multiple grids does not exceed the preset value, and if not, providing identifiers of the multiple grids to the server.

* * * * *